(12) United States Patent
Kuo

(10) Patent No.: US 8,502,965 B2
(45) Date of Patent: Aug. 6, 2013

(54) DEVICE FOR MEASURING LENS ECCENTRICITY

(75) Inventor: Yuan-Lung Kuo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 927 days.

(21) Appl. No.: 12/612,025

(22) Filed: Nov. 4, 2009

(65) Prior Publication Data

US 2010/0142347 A1    Jun. 10, 2010

(30) Foreign Application Priority Data

Dec. 10, 2008   (CN) .......................... 2008 1 0306094

(51) Int. Cl.
*G01B 9/00* (2006.01)

(52) U.S. Cl.
USPC ........ 356/124; 356/124.5; 356/127; 359/811; 451/5

(58) Field of Classification Search
USPC ...... 356/124, 124.5, 125, 126, 127; 359/643, 359/696, 811, 822; 451/5, 8, 41
See application file for complete search history.

(56) References Cited

U.S. PATENT DOCUMENTS

| | | | | |
|---|---|---|---|---|
| 4,383,393 A | * | 5/1983 | Takubo | 451/240 |
| 5,548,396 A | * | 8/1996 | Morita et al. | 356/127 |
| 5,768,061 A | * | 6/1998 | Casey et al. | 360/265 |
| 5,973,772 A | * | 10/1999 | Fukuma et al. | 356/124 |
| 7,880,984 B2 | * | 2/2011 | Yen | 359/822 |
| 7,986,475 B2 | * | 7/2011 | Lin et al. | 359/822 |
| 2002/0034921 A1 | * | 3/2002 | Mizuno et al. | 451/5 |
| 2003/0214646 A1 | * | 11/2003 | Ito | 356/124 |
| 2004/0021951 A1 | * | 2/2004 | Maeda et al. | 359/643 |
| 2005/0111112 A1 | * | 5/2005 | Masuda | 359/696 |
| 2005/0264899 A1 | * | 12/2005 | Manabe | 359/811 |
| 2008/0189727 A1 | * | 8/2008 | Tanaka | 720/681 |

FOREIGN PATENT DOCUMENTS

| | | |
|---|---|---|
| CN | 1987348 A | 6/2007 |
| CN | 101276774 A | 10/2008 |

* cited by examiner

*Primary Examiner* — Sang Nguyen
(74) *Attorney, Agent, or Firm* — Altis Law Group, Inc.

(57) ABSTRACT

A device for measuring eccentricity of a lens includes a support portion, an eccentricity detector, a driving device, a vacuum absorption device, a clamping device, and a rotatable pole. The support portion includes a plurality of gear teeth and a first through hole. The eccentricity detector is positioned above the lens. The driving device includes a driving mechanism and a motor. The motor rotates the driving mechanism. The vacuum absorption device includes an air pipe and a vacuum generation element. The vacuum generation element is for removing air from the air pipe. The clamping device includes a first clamping element and a second clamping element. The first clamping element cooperates with the second clamping element to locate and fix the lens. The rotatable pole includes a second through hole. The rotatable pole is for supporting the support portion.

8 Claims, 2 Drawing Sheets

DEVICE FOR MEASURING LENS ECCENTRICITY

BACKGROUND

1. Technical Field

The present disclosure relates to devices for measuring eccentricity, and particularly, to a device for measuring eccentricity of a lens.

2. Description of Related Art

Currently, digital camera modules are used in a wide variety of portable electronic devices, and in stand-alone digital camera units. Measurement of the eccentricity of a lens is an important parameter influencing imaging quality of a digital camera module.

In measuring the eccentricity of a lens, a measuring device is often used. The measuring device includes a supporting table, a microscope, and an image sensor. In use, first, an optical module is positioned on a center of the supporting table. The supporting table is then rotated manually together with the optical module. The eccentricity of the optical module is then observed through the microscope during the rotation of the optical module. However, because sizes of the lens vary, different devices are required. Thus, the procedure is slow and cumbersome to determine eccentricity of the optical module.

Therefore, a device for measuring eccentricity of a lens is desired to overcome the limitations described.

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present apparatus for assembling a machine tool. Moreover, in the drawings, like reference numerals designate corresponding parts throughout the several views.

DETAILED DESCRIPTION

Figure 1:
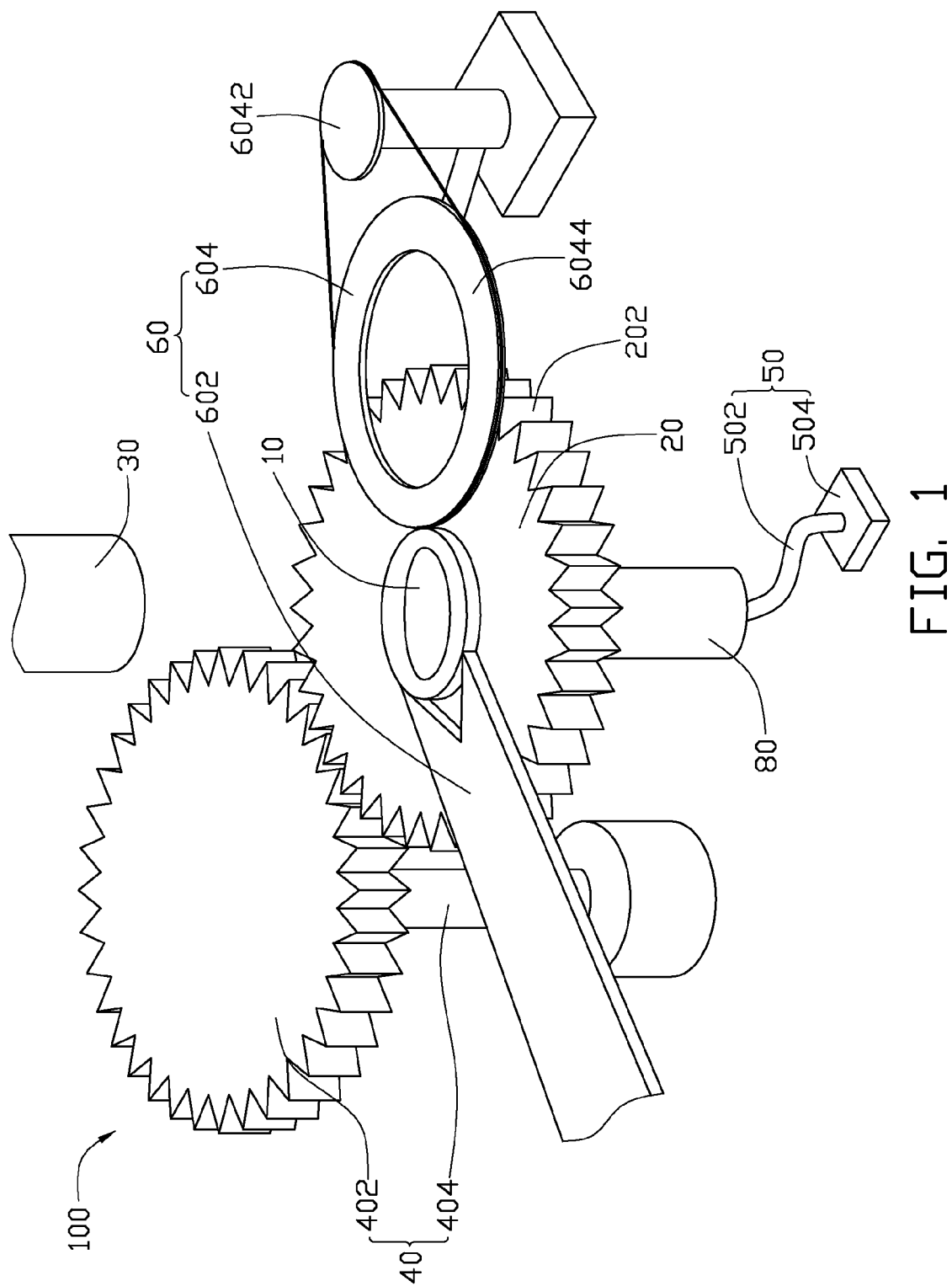
FIG. 1 is a schematic view of one embodiment of a device for measuring eccentricity of a lens.
Figure 2:
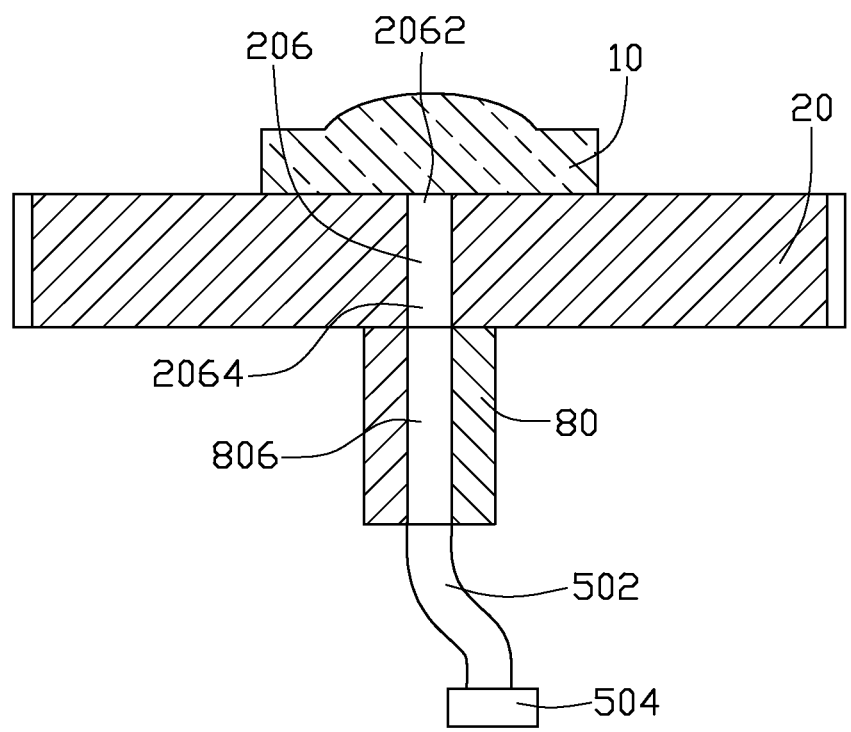
FIG. 2 is a cross section of one embodiment of the device for measuring eccentricity of the lens of FIG. 1.

Referring to FIGS. 1-2, a device 100 for measuring eccentricity of a lens 10 according to one embodiment includes a support portion 20, an eccentricity detector 30, a driving device 40, a vacuum absorption device 50, a clamping device 60, and a rotatable pole 80.

The support portion 20 includes gear teeth 202, and a first through hole 206. The gear teeth 202 are positioned on a circular edge of the support portion 20. The first through hole 206 is defined in the support portion 20. The first through hole 206 includes a first end opening 2062 and a second end opening 2064. The first end opening 2062 supports the lens 10 thereon.

The eccentricity detector 30 is positioned above the lens 10, to measure eccentricity of the lens 10.

The driving device 40 includes a driving mechanism 402 and a motor 404. The driving mechanism 402 may be, for example, a gearwheel or a gear rack. In the illustrated embodiment, a driving mechanism 402 is shown as the gearwheel. The motor 404 rotates the driving mechanism 402. The driving mechanism 402 cooperates with the gear teeth 202 of the support portion 20 to rotate the support portion 20.

The vacuum absorption device 50 includes an air pipe 502 and a vacuum generation element 504. In the illustrated embodiment, the rotatable pole 80 defines a second through hole 806 connecting to the second end opening 2064 of the first through hole 206. The air pipe 502 is received in the first through hole 206 and the second through hole 806. When the lens 10 is to be fixed, the vacuum generation element 504 removes air from the air pipe 502, fixing the bottom of the lens 10 in the support portion 20 by vacuum force. The vacuum generation element 504 adjusts degree of vacuum with variations in size of the lens 10.

The clamping device 60 includes a first clamping element 602 and a second clamping element 604. In the illustrated embodiment, the first clamping element 602 is V-shaped. The first clamping element 602 contacts the lens 10 at two points. The second clamping element 604 may be a belt transmission element. The belt transmission element includes a driving wheel 6042 and a driven wheel 6044. The driven wheel 6044 contacts the lens 10 at one point. The first clamping element 602 cooperates with the second clamping element 604 to locate and fix the lens 10.

The support portion 20 is supported on the rotatable pole 80. In this embodiment, the rotatable pole 80 supports the center of the support portion 20, and the rotatable pole 80 is a hollow pole.

In use, the lens 10 is fixed on the support portion 20 by the vacuum absorption device 50 and the clamping device 60. The eccentricity detector 30 emits a cross-shaped light to a first center of curvature of the lens 10. Clamping device 60 is removed from the lens 10, and the motor 404 rotates the lens 10, cooperating with the support portion 20 and the driving mechanism 402. A rotation angle of the lens 10 can be 90 degrees (°), 180°, or 270°. The clamping device 60 fixes the lens 10 again, and the eccentricity detector 30 emits a cross-shaped light to a second center of curvature of the lens 10. The eccentricity detector 30 receives a changeable cross image because the lens 10 is rotating, and transfers the image to a process device (not shown). Finally, the process device analyzes the change of the image with the rotation of the motor 404, and obtains an eccentricity of the lens 10.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens eccentricity measurement device, comprising:
    a support portion for supporting a lens, the support portion comprising a plurality of gear teeth and a first through hole, wherein the gear teeth are positioned on a circular edge of the support portion, and wherein the first through hole is defined in the support portion;
    an eccentricity detector positioned above the lens for measuring eccentricity of the lens;
    a driving device comprising a driving mechanism and a motor, wherein the motor rotates the driving mechanism and the driving mechanism cooperates with the gear teeth;
    a vacuum absorption device comprising an air pipe and a vacuum generation element, wherein the vacuum generation element removes air from the air pipe;

a clamping device comprising a first clamping element and a second clamping element, wherein the first clamping element cooperates with the second clamping element to locate and fix the lens; and a rotatable pole comprising a second through hole, the rotatable pole supporting the support portion.

2. The device of claim 1, wherein the driving mechanism comprises a gearwheel or a gear rack.

3. The device of claim 1, wherein the first through hole comprises a first end opening and a second end opening, wherein the second end opening connects to the second through hole.

4. The device of claim 1, wherein the air pipe is received in the first through hole and the second through hole.

5. The device of claim 1, wherein the first clamping element is V-shaped.

6. The device of claim 1, wherein the second clamping element is a belt transmission element.

7. The device of claim 6, wherein the belt transmission element comprises a driving wheel and a driven wheel.

8. The device of claim 1, wherein the rotatable pole is a hollow pole.

* * * * *